Dec. 26, 1961 B. H. SHORT ET AL 3,015,009
THERMALLY ACTUATED CIRCUIT CONTROLLER
Filed Feb. 18, 1959
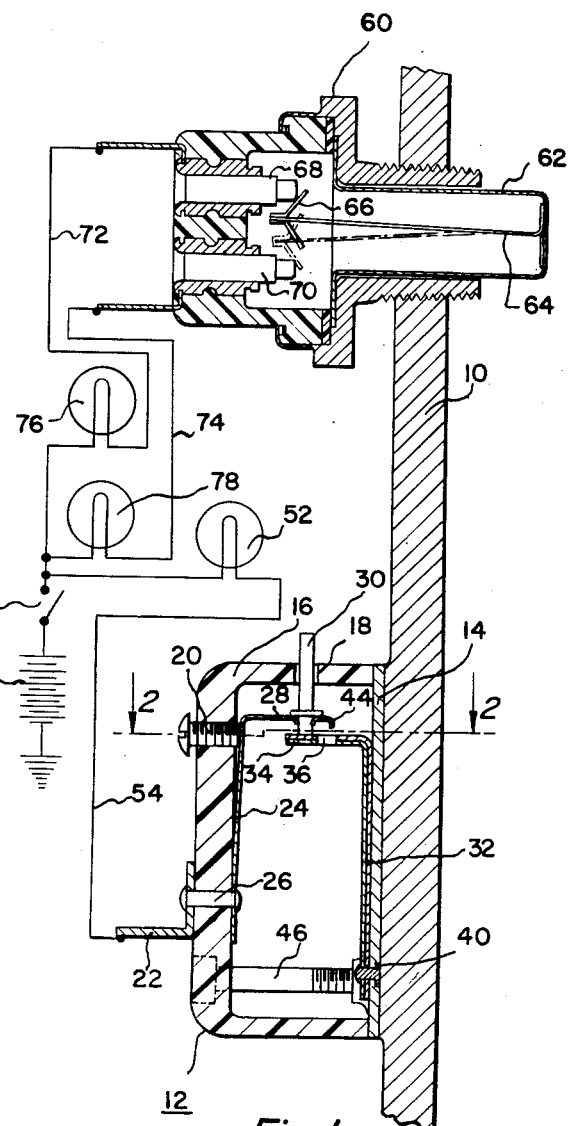
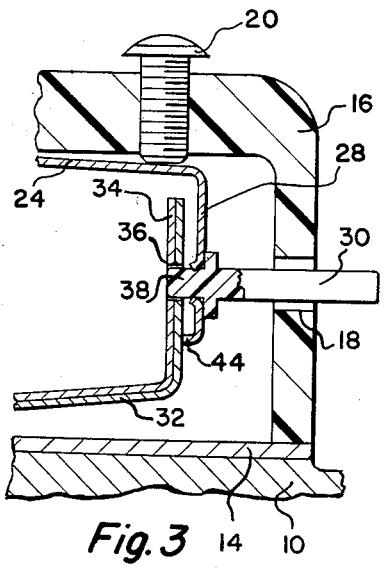
Fig. 3
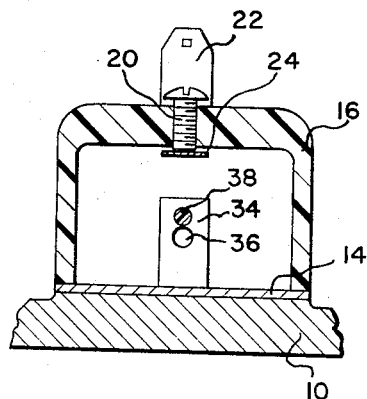
Fig. 2
Fig. 1
INVENTORS.
Brooks H. Short
Robert E. Johnson
BY
Their Attorney United States Patent Office 3,015,009
Patented Dec. 26, 1961

3,015,009
THERMALLY ACTUATED CIRCUIT CONTROLLER
Brooks H. Short and Robert E. Johnson, Anderson, Ind., assignors to General Motors Corporation, Detroit, Mich., a corporation of Delaware
Filed Feb. 18, 1959, Ser. No. 794,155
6 Claims. (Cl. 200—138)

This invention relates to temperature indicating and warning systems and more particularly to a temperature sensing electric switch and circuit therefor that has particular utility in sensing the temperature of the water jacket portion of the block of an internal combustion engine.

It is common practice today to sense and indicate the cooling fluid temperature of the internal combustion engine of a motor vehicle. In some instances, the temperature is indicated by a gage or meter that is calibrated in degrees. In certain other arrangements a pair of lamps are used to indicate either an abnormally low cooling fluid temperature or an abnormally high cooling fluid temperature. An example of this latter type of arrangement is illustrated in the Short et al. Patent 2,759,066.

Although the systems just described are effective to sense cooling fluid temperature they are usually ineffective to give warning to the driver of a vehicle of an abnormally high temperature condition of the engine when the cooling fluid level is low. Thus, when the cooling fluid level is extremely low, the temperature sensing device that normally contacts the cooling fluid may no longer be in contact therewith and the dangerous high temperature condition of the engine is not indicated.

It is, accordingly, an object of this invention to provide a means of warning the driver of a motor vehicle of an abnormally hot engine even when the cooling fluid level is low or non-existent. This object is accomplished by sensing the temperature of the engine block and actuating a warning device when the block or water jacket temperature exceeds a predetermined value.

Another object of this invention is to provide an electric switch that is adapted to sense the temperature of a metal block such as the block of the engine and which includes a metal base that engages the engine block. The metal base is preferably formed of copper or other good heat conducting material and supports a bimetal switch actuator that is in thermal exchange relationship with the base. The bimetal actuator, when heated, moves to a position wherein it engages a spring metal contact member and becomes latched thereto through a latching device. Once the bimetal actuator and spring metal member are latched together it is necesary to manually unlatch them and this may be done by a motor vehicle serviceman.

Further objects and advantages of the present invention will be apparent from the following description, reference being had to the accompanying drawings wherein preferred embodiments of the invention are clearly shown.

In the drawings:

FIGURE 1 is a sectional view illustrating the water jacket or block of an internal combustion engine having mounted thereon the block temperature switch of this invention and a temperature sensing switch that senses the cooling fluid temperature of the engine.

FIGURE 2 is a sectional view taken along line 2—2 of FIGURE 1.

FIGURE 3 is an enlarged view of a portion of the switch illustrated in FIGURE 1 and showing the latching feature of the switch.

Referring now to the drawings and more particularly to FIGURE 1, the reference numeral 10 has been used to indicate the one wall of the block or water jacket of an internal combustion engine. The wall 10, as in conventional internal combustion engine practice, will contain a cooling fluid on the right hand side thereof which is used to cool the engine and which is circulated between the engine and a radiator. The block 10, as in conventional motor vehicle electric circuitry, is at ground potential as is evident from FIGURE 1. The block temperature switch of this invention is generally indicated by reference numeral 12 and comprises a metal base member 14 that is formed of copper or other good heat conducting material. The switch has a cover 16 formed of any suitable insulating material which is riveted or otherwise secured to base 14 and this cover has an opening designated by reference numeral 18. The cover carries a threaded adjusting member 20 and an electrical connector designated by reference numeral 22. The electrical connector 22 is connected with an L-shaped spring metal contactor member 24 by means of a rivet 26 which passes through the cover 16. The leg portion 28 of L-shaped member 24 carries a latching member 30 that is formed of insulating material. The member 30 is secured in any conventional manner to the leg portion 28 and passes through the opening 18 formed in cover 16. The member 30 as will become more readily apparent hereinafter may be grasped to release the switch from its latched position.

The metal base member 14 carries a bimetal actuator designated by reference numeral 32. The bimetal actuator 32 as is well known to those skilled in the art is formed of two dissimilar metal materials and these materials are arranged so that the end of the actuator 34 moves away from base member 14 upon an increase of temperature. The end portion 34 of the bimetal actuator 32 has an opening 36 which at times snaps over the nose portion 38 of insulating member 30. It is seen from FIGURE 1 that the bimetal actuator has one end thereof riveted to the base member 14 as at 40. When the bimetal 32 is cool, the lower portion thereof is in engagement with the base member 14 and is therefore in good heat conductive relationship therewith.

When the temperature of block member 10 is below some predetermined value the bimetal actuator 32 is in the position shown in FIGURE 1 with the end of nose portion 38 contacting the end 34 of the bimetal actuator. When the end 34 of the actuator moves away from base member 14 due to a predetermined increase in temperature of block 10, the portion 34 of the bimetal actuator slides freely on the nose 38 of insulator member 30. At some predetermined point in the movement of the end 34 of the bimetal the nose 38 of insulator member 30 will snap into the opening 36 formed in portion 34 of the bimetal. When the nose of insulator member 30 snaps into the opening formed in the bimetal member, a circuit is completed between spring metal member 28 and the bimetal member 32 through the projecting portion 44 of member 28. Before the nose 38 of insulator member 30 snaps into the opening in the bimetal member 34, the projecting portion 44 of spring metal member 28 is prevented from engaging the bimetal member and therefore no circuit is completed through the switch. The switch is preferably held to the block 10 by one or more screw threaded members 46 which pass through the cover 16, through the metal base member 14 and which are threaded into the block 10. These fasteners 46 hold the metal base member 14 in tight engagement with the block 10 and thus the block is in good heat exchange relationship with the base member 14. It will also be apparent that the base member 14 forms an electrical connection for one side of the switch, the current passing between block 10 and terminal 22 through spring metal member 24, bimetal 32 and through the metal base member 14.

In FIGURE 1, a circuit diagram for use with the switch of this invention is illustrated. As shown in this figure the storage battery 48 of a motor vehicle has one side thereof grounded and has its opposite side connected with switch 50. One side of the switch 50 is connected with an electric lamp 52 whereas the opposite side of the lamp is connected with terminal 22 via lead 54. It can be seen that whenever the temperature of block 10 rises above some predetermined dangerous value the bimetal member 32 will be moved away from base member 14 and to become engaged with spring metal member 24 and thus complete a circuit for the lamp 52. When the lamp becomes incandescent, it indicates a dangerously hot condition of the engine. The lamp 52 will remain incandescent until the temperature of block 10 goes below a predetermined value and until the insulator member 30 is pulled rightwardly as in FIGURE 3 to release the bimetal member 32. During the releasing of the bimetal member 32 the lower end of adjusting screw 20 acts as a fulcrum for the portion 28 of spring metal member 24 and by pulling the insulator member 30 rightwardly in FIGURE 3 the spring metal member 28 is deflected enough to permit release of the bimetal member 32. This latching feature is incorporated so that the operator of a motor vehicle will immediately drive to the nearest service organization in order to determine the cause of the hot engine.

The system for indicating the temperature of an internal combustion engine may also include circuitry for indicating the cooling fluid temperature. To this end, a switch generally designated by reference numeral 60 is provided which is threaded into the block 10 of the engine. This switch is identical with the switch illustrated in the Short et al. Patent 2,759,066. The switch 60 has a metal cup-shaped member 62 which carries a bimetal member 64. The bimetal member 64 is attached to one end of the cup-shaped member 60 and has a Y-shaped contactor 66 which engages contacts 68 and 70. The contact 68 is connected with a lead wire 72 whereas the contact 70 is connected with a lead wire 74. An electric lamp 76 is connected between switch 50 and lead wire 72 and a second electric lamp 78 is connected between lead wire 74 and switch 50. The switch 60 operates to indicate both an abnormally low and high temperature condition of the cooling fluid contained by block 10. When the temperature of the cooling fluid contained within block 10 is below some predetermined value, the light 76 becomes incandescent due to contactor 66 contacting the contactor 68. When the cooling fluid temperature is at its normal value the contactor 66 does not engage either contact 68 or 70 so that neither light 76 or 78 becomes incandescent. When the cooling fluid temperature is above some normal safe value, the contactor 66 engages contactor 70 and the lamp 78 becomes incandescent to indicate an abnormally high cooling medium temperature.

It is to be observed that the switch 60 does not indicate the temperature of block 10 as the cup-shaped member 62 is spaced therefrom and contacts the cooling medium contained within block 10. Should this cooling medium become abnormally low so as to not contact the cup-shaped member 62 it is possible that the lamp 78 will not become incandescent to indicate a hot temperature condition of the engine. In the circuit of FIGURE 1, this dangerous condition, however, would be indicated by the block temperature switch 12 as the temperature of the block would greatly increase to cause the bimetal member 32 to contact the spring metal member 24 and thus complete a circuit to electric lamp 52. It will, of course, be appreciated that any abnormal temperature of the block 10 will be indicated by the switch 12 regardless of its cause. The closing temperature of the switch 12 may be adjusted by adjusting the screw 20 which moves the spring metal member 24 in relation to the portion 34 of the bimetal member 32.

While the embodiments of the invention as herein disclosed constitute preferred forms, it is to be understood that other forms might be adopted.

What is claimed is as follows:

1. An electric switch comprising, a metal base member, a bimetal actuator supported by said metal base member in heat exchange relationship therewith, a cover member, a spring metal member suported by said cover member, and an insulator member supported by said spring metal member having a projecting portion, an opening in said bimetal member, said opening being adapted to receive the end of said insulator member to latch said spring metal member and bimetal member together when said bimetal member deflects under a change of temperature of said metal base member.

2. A thermally actuated circuit controller comprising, a base member formed of a single piece of metal material, a cover member attached to said base member and formed of insulating material, a spring metal contact member supported by said cover member and carrying a part formed of insulating material, and a bimetal member supported by said base member and having an opening adapted to receive said insulator part when said bimetal member is deflected in a predetermined direction upon a change in temperature of the base member.

3. A circuit controller comprising, a base member formed of metal material, a cover member supported by said base member, a spring metal member supported by said cover member, a manually actuable insulator member supported by said spring metal member having a portion extending through an opening in said cover member and having a nose portion, and a bimetal member supported by said base member having an opening that is adapted to receive the nose portion of said insulator member when said bimetal member is deflected.

4. A circuit controller comprising, a metal base member, a cover member formed of insulating material supported by said metal base member, a member formed of spring metal material supported by said cover member and carrying an insulator member that extends through an opening formed in the cover member and which has a nose portion, a bimetal member supported by said base member in thermal exchange relationship therewith, a portion of said bimetal member contacting the nose portion of said insulator member and slidable thereon, said bimetal member having an opening that is adapted to receive the nose portion of said insulator member when said bimetal member is deflected a predetermined amount, and a terminal connector connected with said spring metal member forming one terminal of said electric switch, said base member forming the other terminal of said electric switch.

5. The structure according to claim 4 wherein means are provided for moving the spring metal member with respect to the bimetal member to adjust the temperature of engagement of said spring metal member and bimetal member.

6. An electric switch comprising, a metal base, a bimetal actuator member supported by said metal base in heat exchange relationship therewith, a part formed of insulating material supported by said meal base, a spring metal member supported by said part, an opening in one of said members, and projecting means extending from the other of said members, said opening being adapted to receive said projecting means to latch said spring metal member and said bimetal member together when said bimetal member deflects under a change of temperature of said metal base.

References Cited in the file of this patent

UNITED STATES PATENTS

| | | |
|---|---|---|
| 1,393,968 | Rishel | Oct. 18, 1921 |
| 2,340,099 | Acly et al. | Jan. 25, 1944 |
| 2,471,806 | Wilson et al. | May 31, 1949 |
| 2,780,698 | Youhouse | Feb. 5, 1957 |
| 2,863,024 | Romine | Dec. 2, 1958 |